(12) United States Patent (10) Patent No.: US 9,147,275 B1
Hyde-Moyer et al. (45) Date of Patent: Sep. 29, 2015

(54) APPROACHES TO TEXT EDITING

(71) Applicant: A9.com, Inc., Palo Alto, CA (US)

(72) Inventors: Sonja E. Hyde-Moyer, Redwood City, CA (US); Joel D. Tesler, Cupertino, CA (US); Leslie Kunling Wang, Cupertino, CA (US)

(73) Assignee: A9.com, Inc., Palo Alto, CA (US)

( * ) Notice: Subject to any disclaimer, the term of this patent is extended or adjusted under 35 U.S.C. 154(b) by 351 days.

(21) Appl. No.: 13/680,983

(22) Filed: Nov. 19, 2012

(51) Int. Cl.
*G06T 11/60* (2006.01)
*G06K 9/00* (2006.01)
*G06F 3/041* (2006.01)
*G06F 3/0488* (2013.01)

(52) U.S. Cl.
CPC ............... *G06T 11/60* (2013.01); *G06F 3/0416* (2013.01); *G06F 3/0488* (2013.01); *G06K 9/00* (2013.01)

(58) Field of Classification Search
CPC ......... G06T 11/60; G06T 7/00; G06F 3/0416; G06F 3/0488; G06K 9/00
USPC ........... 345/173, 179; 715/773, 823; 704/231, 704/233, 235; 714/747; 382/229; 348/222.1; 455/563
See application file for complete search history.

(56) References Cited

U.S. PATENT DOCUMENTS

| | | |
|---|---|---|
| 3,001,439 A | 9/1961 | Rouy |
| 4,876,457 A | 10/1989 | Bose |
| 5,418,864 A | 5/1995 | Murdock et al. |
| 5,611,000 A | 3/1997 | Szeliski et al. |
| 5,694,491 A | 12/1997 | Brill et al. |
| 5,717,781 A | 2/1998 | Ebel et al. |
| 5,754,978 A | 5/1998 | Perez-Mendez et al. |
| 5,855,000 A | 12/1998 | Waibel et al. |
| 5,974,159 A | 10/1999 | Lubin |
| 5,983,218 A | 11/1999 | Syeda-Mahmood |
| 6,075,905 A | 6/2000 | Herman et al. |
| 6,307,959 B1 | 10/2001 | Mandelbaum et al. |
| 6,446,060 B1 | 9/2002 | Bergman |
| 6,580,811 B2 | 6/2003 | Maurer et al. |
| 6,668,074 B1 | 12/2003 | Wilson |

(Continued)

FOREIGN PATENT DOCUMENTS

| | | |
|---|---|---|
| CN | 101010693 | 8/2007 |
| CN | 101231662 | 7/2008 |

(Continued)

OTHER PUBLICATIONS

CN Second Office Action mailed Aug. 28, 2013; in corresponding Chinese patent No. 201080008793.1.

(Continued)

*Primary Examiner* — Chante Harrison
(74) *Attorney, Agent, or Firm* — Hogan Lovells US LLP

(57) ABSTRACT

Certain text editing techniques are provided to enable the user to select a few characters or words from an original collection of text by a limited number of user inputs, such as by touching or swiping a character or word to be edited. Options for probable edits of the original text can be automatically presented to the user in a manner that also only requires a minimal number of user inputs. Such techniques may facilitate text editing that is easier and more convenient for users of portable electronic devices. These techniques may be particularly advantageous for enabling editing of text acquired from an optical character recognition (OCR) process on any computing device. Other text editing shortcuts and similar approaches are also described.

23 Claims, 9 Drawing Sheets

(56) References Cited

U.S. PATENT DOCUMENTS

| | | | |
|---|---|---|---|
| 6,671,404 B1 | 12/2003 | Kawatani et al. | |
| 6,941,016 B1 | 9/2005 | Wagman et al. | |
| 7,003,161 B2 | 2/2006 | Tessadro | |
| 7,072,872 B2 | 7/2006 | Caid et al. | |
| 7,109,987 B2 | 9/2006 | Goel et al. | |
| 7,206,437 B2 | 4/2007 | Kramer et al. | |
| 7,240,062 B2 | 7/2007 | Andersen et al. | |
| 7,251,637 B1 | 7/2007 | Caid et al. | |
| 7,650,035 B2 | 1/2010 | Vincent et al. | |
| 7,742,642 B2 | 6/2010 | Goldstein | |
| 7,894,689 B2 | 2/2011 | Liu et al. | |
| 8,037,043 B2 | 10/2011 | Zoeter | |
| 8,126,247 B2 | 2/2012 | Chiang et al. | |
| 8,126,272 B2 | 2/2012 | Carr et al. | |
| 8,175,388 B1 | 5/2012 | Fisher | |
| 8,184,155 B2 | 5/2012 | Ke | |
| 8,214,387 B2 | 7/2012 | King | |
| 8,406,507 B2 | 3/2013 | Ruzon et al. | |
| 8,644,610 B1 | 2/2014 | Ramkumar et al. | |
| 2002/0051575 A1 | 5/2002 | Myers et al. | |
| 2002/0181745 A1 | 12/2002 | Hu | |
| 2003/0037097 A1 | 2/2003 | Meyer et al. | |
| 2003/0208502 A1 | 11/2003 | Lin | |
| 2003/0216913 A1* | 11/2003 | Keely et al. | 704/235 |
| 2004/0057619 A1 | 3/2004 | Lim et al. | |
| 2004/0088291 A1 | 5/2004 | Furuhashi | |
| 2004/0255218 A1* | 12/2004 | Tada et al. | 714/747 |
| 2005/0002571 A1 | 1/2005 | Hiraga et al. | |
| 2005/0060273 A1 | 3/2005 | Andersen et al. | |
| 2005/0099406 A1* | 5/2005 | Pettiross et al. | 345/179 |
| 2005/0131686 A1* | 6/2005 | Yamamoto et al. | 704/231 |
| 2005/0180632 A1 | 8/2005 | Aradhye et al. | |
| 2005/0240407 A1 | 10/2005 | Simske et al. | |
| 2005/0271304 A1 | 12/2005 | Retterath et al. | |
| 2006/0013450 A1 | 1/2006 | Shan et al. | |
| 2006/0045348 A1 | 3/2006 | Kiros et al. | |
| 2006/0120629 A1 | 6/2006 | Myers et al. | |
| 2006/0212856 A1 | 9/2006 | Simske et al. | |
| 2006/0262976 A1 | 11/2006 | Hart et al. | |
| 2006/0285746 A1 | 12/2006 | Yacoub et al. | |
| 2007/0033026 A1* | 2/2007 | Bartosik et al. | 704/233 |
| 2007/0046645 A1* | 3/2007 | Hirota et al. | 345/173 |
| 2007/0047767 A1 | 3/2007 | Watabe | |
| 2007/0172117 A1 | 7/2007 | Wong | |
| 2007/0260639 A1 | 11/2007 | Tobin et al. | |
| 2007/0286486 A1 | 12/2007 | Goldstein | |
| 2008/0060034 A1 | 3/2008 | Egnal et al. | |
| 2008/0063279 A1 | 3/2008 | Vincent et al. | |
| 2008/0095448 A1 | 4/2008 | Ono et al. | |
| 2008/0101726 A1 | 5/2008 | Myers et al. | |
| 2008/0118146 A1 | 5/2008 | Cieplinski | |
| 2008/0144943 A1 | 6/2008 | Gokturk et al. | |
| 2008/0240618 A1 | 10/2008 | Chen et al. | |
| 2008/0273807 A1 | 11/2008 | Dauw et al. | |
| 2008/0298718 A1 | 12/2008 | Liu et al. | |
| 2008/0304753 A1 | 12/2008 | Sohma et al. | |
| 2009/0070110 A1 | 3/2009 | Erol et al. | |
| 2009/0070415 A1 | 3/2009 | Kishi et al. | |
| 2009/0074300 A1 | 3/2009 | Hull et al. | |
| 2009/0100050 A1 | 4/2009 | Erol et al. | |
| 2009/0125510 A1 | 5/2009 | Graham et al. | |
| 2009/0254543 A1 | 10/2009 | Ber et al. | |
| 2009/0275365 A1* | 11/2009 | Lee et al. | 455/563 |
| 2010/0080493 A1 | 4/2010 | McGatha et al. | |
| 2010/0102119 A1 | 4/2010 | Gustin et al. | |
| 2010/0166309 A1 | 7/2010 | Hull | |
| 2010/0166339 A1 | 7/2010 | Gokturk et al. | |
| 2010/0245230 A1* | 9/2010 | Yaun | 345/156 |
| 2010/0259633 A1* | 10/2010 | Kll | 348/222.1 |
| 2010/0329574 A1 | 12/2010 | Moraleda et al. | |
| 2011/0035662 A1 | 2/2011 | King et al. | |
| 2011/0158548 A1* | 6/2011 | Aizawa | 382/229 |
| 2011/0255794 A1 | 10/2011 | Neogi et al. | |
| 2011/0286627 A1 | 11/2011 | Takacs et al. | |
| 2012/0063686 A1 | 3/2012 | Dauw et al. | |
| 2012/0072110 A1 | 3/2012 | Venkatraman | |
| 2012/0092329 A1 | 4/2012 | Koo et al. | |
| 2012/0114249 A1 | 5/2012 | Conwell | |
| 2012/0170852 A1 | 7/2012 | Zhang et al. | |
| 2012/0194430 A1* | 8/2012 | Kwon et al. | 345/157 |
| 2012/0245835 A1 | 9/2012 | Weitz et al. | |
| 2012/0310643 A1 | 12/2012 | Labsky et al. | |
| 2013/0218886 A1 | 8/2013 | Graham et al. | |
| 2013/0231852 A1 | 9/2013 | Weitz et al. | |
| 2013/0346431 A1 | 12/2013 | Erol et al. | |
| 2014/0115519 A1* | 4/2014 | Ouyang et al. | 715/773 |
| 2014/0304655 A1* | 10/2014 | Imoto et al. | 715/823 |

FOREIGN PATENT DOCUMENTS

| | | |
|---|---|---|
| JP | 2004-240692 | 8/2004 |
| JP | 2006-331117 | 7/2006 |

OTHER PUBLICATIONS

USPTO Notice of Allowance mailed Jul. 29, 2013; in corresponding U.S. Appl. No. 13/491,398.
USPTO Notice of Allowance and Fee(s) Due mailed Feb. 4, 2014; in corresponding U.S. Appl. No. 13/429,135.
USPTO Notice of Allowance and Fee(s) Due mailed Feb. 5, 2014; in corresponding U.S. Appl. No. 12/378,599.
EP Search Report dated Jun. 6, 2013, Europe Patent Application No. 10744249.3, Jun. 6, 2013, 5 pages.
USPTO Final Office Action dated Jan. 30, 2012, U.S. Appl. No. 12/378,599, 15 pages.
JP Final Office Action dated May 14, 2013, Japanese Application No. 2011-551189, 1 page.
CN First Office Action dated Feb. 1, 2013, Chinese Patent Application No. 201080008793.1, 25 pages.
PCT International Preliminary Report on Patentability mailed Jul. 28, 2011, International Application No. PCT/US2010/020943, 8 pages.
PCT International Search Report and Written Opinion mailed Mar. 30, 2010, International Application No. PCT/US2010/024466, 11 pages.
PCT International Preliminary Report on Patentability mailed Jul. 28, 2011, International Application No. PCT/US2010/021206, 8 pages.
PCT International Written Opinion mailed Mar. 30, 2013, International Application No. PCT/US2010/024466, Mar. 30, 2013, 4 pages.
JP Non Final Office Action dated Jan. 8, 2013, Japanese Application No. 2011-551189, Jan. 8, 2013, 2 pages.
USPTO Non Final Office Action dated May 7, 2012, U.S. Appl. No. 12/319,992, 19 pages.
USPTO Non Final Office Action dated Jun. 24, 2011, U.S. Appl. No. 12/378,599, 10 pages.
USPTO Non Final Office Action dated Jun. 6, 2012, U.S. Appl. No. 12/321,235, 29 pages.
USPTO Notice of Allowance dated Oct. 26, 2012, U.S. Appl. No. 12/319,992, 7 pages.
USPTO Notice of Allowance dated Nov. 29, 2012, U.S. Appl. No. 12/321,235, Nov. 29, 2012, 14 pages.
USPTO Notice of Allowance dated Feb. 6, 2015, U.S. Appl. No. 13/688,772, Feb. 6, 2015, 19 pages.
Baatz, Georges et al., "Handling Urban Location Recognition as a 2D Homothetic Problem", http://www.inf.ethz.ch/personal/pomarc/pubs/BaatzECCV1O.pdf, 2010, 14 pages.
Baumberg, Adam, "Reliable Feature Matching Across Widely Separated Views", Proceedings of Computer Vision and Pattern Recognition, vol. 1, 2000, pp. 1774-1781.
Berretti, Stefano et al., "Merging Results for Distributed Content Based Image Retrieval", Multimedia Tools and Applications, Kluwer Academic Publishers, vol. 24; No. 3, Dec. 1, 2004, pp. 215-232.
Brener, Nathan E et al., "A Conclusive methodology for rating OCR performance," Article first published online: Jul. 26, 2005, Journal of the American Society for Information Science and Technology, vol. 56, Issue 12, pp. 1274-1287, Oct. 2005.

(56) References Cited

OTHER PUBLICATIONS

Chen, David M. et al., "City-Scale Landmark Identification on Mobile Devices", http://www.inf.ethz.ch/personal/gbaatz/papers/chen11.pdf, 2011, 8 pages.

Cheng, Liang et al., "Robust Affine Invariant Feature Extraction for Image Matching", IEEE Geoscience and Remote Sensing Letters, vol. 5, No. 2, 2008, 5 pages.

Chu et al., "Image-guided tours: Fast-approximated sift with u-surf features", Technical report, Stanford University, Department of Electrical Engineering, 2007.

Fischler, Martin A. et al., "Random Sample Consensus: A Paradigm for Model Fitting with Applications to Image Analysis and Automated Cartography", Communications of the ACM, vol. 24, 1981, pp. 381-395.

Jia et al., "Photo-to-Search: Using Camera Phones to Inquire of the Surrounding World", Proceedings of the 7th International Conference on Mobile Data Management (MOM '06), 2006.

Labe, T. et al., "Automatic Relative Orientation of Images", Proceedings of the Fifth Turkish-German Joint Geodetic Days, Berlin, Germany, 2006, 6 pages.

Lowe, David G., "Distinctive Image Features from Scale-Invariant Keypoints", International Journal of Computer Vision, 2004, pp. 91-110.

Philbin, James et al., "Object Retrieval with Large Vocabularies and Fast Spatial Matching", Proceedings of Computer Vision and Pattern Recognition, 2007, 9 pages.

Schmid, Cordelia et al., "Local Grayvalue Invariants for Image Retrieval", IEEE Transactions on Pattern Analysis and Machine Intelligence, vol. 19, May 5, 1997, pp. 530-535.

Songhua, Xu et al., "Boosting text extraction from biomedical images using text region detection," Published in: Biomedical Sciences and Engineering Conference (BSEC), 2011—Date of Conference: Mar. 15-17, 2011, pp. 1-4.

Wang, Yizhou et al., "Object Recognition Using Multi-View Imaging", Signal Processing, ICSP 2008, Ninth International Conference on IEEE, Piscataway, New Jersey, Oct. 26, 2008, pp. 810-813.

Winder, Simon A. et al., "Learning Local Image Descriptors", Proceedings of Computer Vision and Pattern Recognition, 2007, 8 pages.

Zheng, Yu et al., "Distributed Architecture for Large Scale Image-Based Search", Multimedia and Expo, 2007 IEEE International Conference, Jul. 1, 2007, pp. 579-582.

\* cited by examiner

APPROACHES TO TEXT EDITING

BACKGROUND

Advances in technology associated with personal or portable electronic devices, such as smart phones, tablets, portable media players, and e-book readers, are allowing users to perform computing tasks on such devices that may have been traditionally designed for workstations, servers, and supercomputers. For example, cloud computing potentially allows the user to harness the processing power of hundreds or thousands of servers from the user's portable device. Another example is how wireless technologies have untethered the user from static locations in order to access networks such as the internet. However, not all computing tasks have been made easier as a result of the transition from workstations, servers, and supercomputers to more portable computing devices.

BRIEF DESCRIPTION OF THE DRAWINGS

Various embodiments in accordance with the present disclosure will be described with reference to the drawings, in which.

DETAILED DESCRIPTION

Figure 1A:
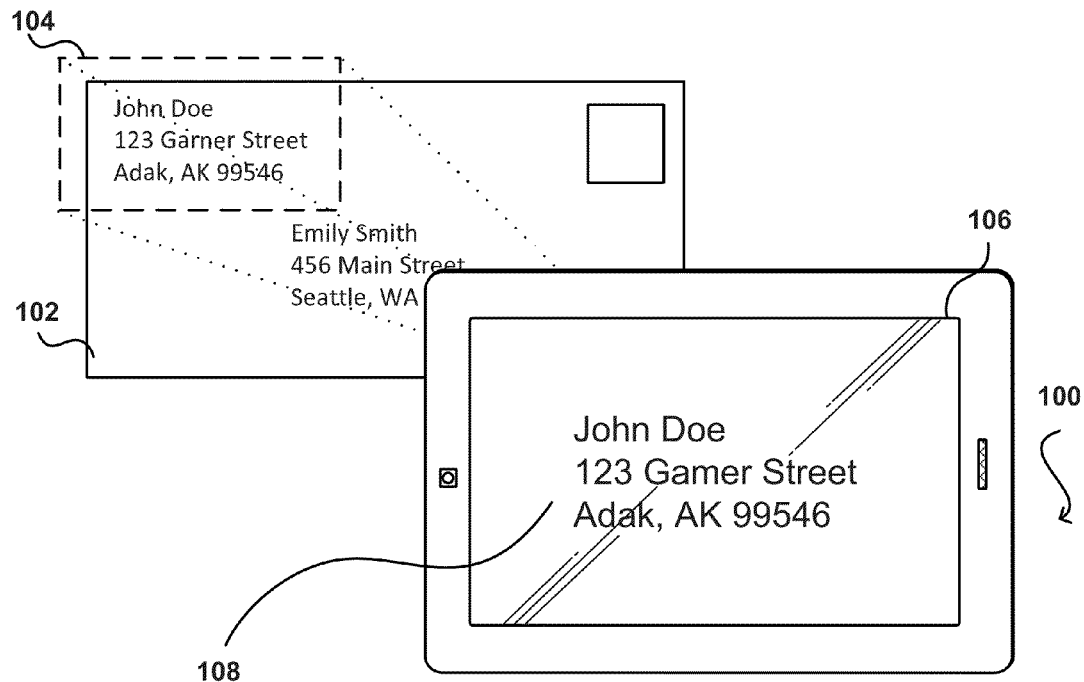
FIGS. 1(a), (b), and (c) illustrate an example of enabling quick text editing of an image featuring a piece of mail in accordance with an embodiment.

Users of electronic devices often desire to edit text from their devices for a variety of applications, such as email, text messaging, word processing, blogging, or optical character recognition (OCR) processes. Conventional approaches to text editing require a keyboard to enable users to edit text from their computing devices. In many situations, however, a keyboard may hinder more than help the user edit text. For example, the keyboard for an electronic device may be implemented in software and can be displayed on a display component of the device so as to substantially limit what else can be displayed, including the text requiring editing. In addition, the keyboard keys, whether implemented in software or hardware, may be limited to a certain size to accommodate the dimensions of an electronic device. As a result, editing text is often difficult and frustrating for many users of electronic devices. In other situations, the number of edits for a particular piece of text may be of a limited nature but conventional approaches are not optimized for such editing. For instance, a user may only want to replace a single character in a word, such as replacing "complimentary" with "complementary," but conventional text editing approaches on electronic devices typically require the user to replace the entire word and re-type the correct word. Systems and methods in accordance with various embodiments of the present disclosure may overcome one or more of the aforementioned and other deficiencies experienced in conventional approaches to text editing.

In various embodiments, a set of characters is obtained by a computing device from an OCR process of an image incorporating text. In general, an OCR process may refer to an application that converts image data representing text, which can be embodied as a combination of pixels or vectors, to a machine-readable format, such as the American Standard Code for Information Interchange (ASCII), Unicode, or variations thereof. It will be appreciated that there are numerous approaches for such image-to-text conversion. In some embodiments, the OCR process may be a stand-alone application that resides entirely on the computing device. In other embodiments, the OCR application may operate according to a client-server model in which the server receives an image containing text from the client and responds by providing the text in a format such ASCII or Unicode. One such approach is described in co-pending U.S. patent application Ser. No. 13/688,772, filed Nov. 9, 2012, entitled "Image-Based Character Recognition," which is hereby incorporated herein by reference in its entirety. OCR is known in the art and, other than what is described in U.S. patent application Ser. No. 13/688,772, will not be discussed herein in detail.

Despite the many advances in OCR technology, character recognition may not always be precise because accuracy is largely dependent on the source image. Thus, how an image is acquired and the quality of the source text plays a significant role in the results obtained from an OCR process. For example, environmental conditions such as poor or varied lighting can degrade image quality and thereby affect OCR accuracy. User error during image capture such as movement or jitter, acquiring the image at an odd or skewed angle, or obtaining occluded or partially occluded text may also diminish OCR accuracy. Vagaries in the source text itself can impair the quality of the results of an OCR process. For instance, an artificially intelligent OCR system may not be able to process with complete accuracy certain handwriting that may be difficult even for a human eye to decipher. Text produced from a machine can also generate OCR errors if the typeface or font contains an excessive amount of serifs or other such ornamental flourishes and/or if the typeface is otherwise unusual and distinct. In addition, blemishes to the source text, such as due to smudged ink and the like, are also known to affect OCR accuracy.

In an embodiment, in what will be referred to herein as "character editing mode," text editing can be optimized by enabling a user to select a limited number of characters which the user desires to edit with minimal commands or gestures, such as a few touches or swipes of the characters requiring editing. In another embodiment of character editing mode, the user does not select any characters. Instead, characters likely to require editing are automatically determined and presented to the user. Character sets that are probable replacement candidates for the selected characters or characters likely be erroneous can be determined and each set may be presented to the user. The user can edit the original set of characters by choosing one of the replacement candidates according to minimal commands or gestures. Preferably, the replacement candidates are presented to the user in a manner that limits the amount of space on the display component of a computing device while being sufficiently distinct from each other and other selectable user interface components to minimize ambiguity of the user selection. In other words, replacement candidates are provided to disambiguate user selection at the outset instead of conventional approaches which may require additional user input, such as a request to magnify the view of a region of interest.

In another embodiment, in what will be referred to herein as "word editing mode," text editing can be enhanced to be easier and more convenient for the user by enabling the user to select a word which the user wants to edit according to minimal commands or gestures. It will be appreciated that in other embodiments of word editing mode no user selection is required, and instead words that are determined to likely be erroneous can be automatically selected. Words that are likely to be candidates for replacement of the selected word can be acquired and presented to the user to pick from in a manner requiring minimal commands or gestures on the part of the user. The candidates for replacement can be displayed on a display component without completely occluding a substantial portion of the display surface such as by limiting the "real estate" taken up by the replacement candidates or by rendering the replacement candidates semi-transparent. Such approaches may also be implemented in a way to disambiguate user selection.

In various embodiments, replacement candidates for selected characters and/or words can be determined according to probability or statistical analyses. For example, an initial volume of text which is already in machine-readable format can be selected to represent a baseline. The baseline can be imaged or scanned, and a certain OCR process can be performed on the baseline. Errors for the particular OCR process can be determined by comparing against the baseline, and probabilities that particular characters or words are misrecognized can be tabulated. The data may be then organized according to a confusion matrix, a hidden Markov model, or other such model. A lookup table, hash map, or other associative data structure can be derived from these models to select replacement candidates. The data used to generate the models can be dynamic and include user-specific data. Such an approach can be advantageous as user behavior can be learned, and the replacement candidates may become more accurate and useful over time. The data used to generate the models can also be aggregated from a collection of users to increase the overall artificial intelligence of the system. In other embodiments, image processing techniques can be used to determine replacement candidates. Image processing techniques may include extracting features from the original image of the selected character and comparing the features of the selected character against an image database for best matches, and selecting the characters corresponding to the best matches as replacement candidates. Alternative embodiments may combine these approaches.

Various other functions and advantages are described and suggested below in accordance with the various embodiments.

FIGS. 1(a), (b), and (c) illustrate an example of enabling quick text editing in accordance with an embodiment. In FIG. 1(a), the subject matter of a captured image is an addressed stamped envelope 102. An image capturing component of a computing device 100 is used to capture a location 104 at the upper left hand corner of envelope 102 corresponding to the sender and return address. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, cellular phones, video gaming consoles or controllers, and portable media players, digital cameras (including point-and-shoot, bridge, micro four thirds, and single-lens reflex (SLR) cameras), among others. In this example, the sender is "JOHN DOE" and the return address is "123 GARNER STREET ADAK, Ak. 99546." The user of device 100 may want to store "JOHN DOE" in an electronic address book or contacts list, and utilizes a camera incorporated in device 100 to obtain a live camera view of location 104 of envelope 102. An OCR process is executed on the live camera view corresponding to location 104, and the results of the OCR process 108 are presented overlaying the live camera view in a display component 106 of computing device 100. FIG. 1(a) is an example of an augmented reality application, but it will be appreciated that other embodiments are contemplated. For instance, the captured image may not necessarily be from a live camera view in other embodiments. Instead, an image or a video can be stored on a device and the OCR process can be implemented on the image or a frame of the video. The results of the OCR program may or may not include non-text elements of the original image. The results of the OCR application may or may not conform to the dimensions of the text from the original image. For example, in one embodiment, the OCR software may include a font library and the computing device will attempt to present results in a font that best matches the text from the original image or the computing device may try to preserve the size of the text of the original image. In addition, the image or video processed by the OCR application may be obtained from a source other than an image capturing component of the computing device 100. Any conventional file transfer or data streaming method can be used to obtain the image, including via wireless communication channels such as Wi-Fi, cellular, or Bluetooth, or via a Universal Serial Bus (USB) port. All such variations are contemplated, and are within the scope of various embodiments.

In the example of FIG. 1(a), the sender's name and address have been handwritten (or typed with a distinctive typeface) at location 104 of envelope 102, and is recognized as "JOHN DOE 123 GAMER STREET ADAK, Ak. 99546" as illustrated by OCR results 108. Here, the "rn" in "GARNER" has been recognized as an "m." Thus, the user would like to correct the results 108. This type of OCR error may be considered a combination error as the original characters, i.e., "RN," were recognized by the OCR process as "M." Typical OCR errors can be classified in a number of ways, such as for example:

1) Character interchange: when an original character has been recognized as a different character by the OCR process, e.g., "e" (lowercase e) has been mis-recognized as "c" (lowercase C), "o" (lowercase O), or "0" (zero);
2) Missing character: when an original character has been missed by the OCR process, e.g., "example" has been mis-recognized as "exmple";
3) Character insertion: when the OCR process inserts a character which may be caused by spacing errors and marks/blemishes on documents, e.g., "example" has been mis-recognized as "exa,mple";
4) Character combination: when the OCR process combines two or more original characters as one different character, e.g., "example" has been mis-recognized as "exampb"; and
5) Character decomposition: when the OCR process decomposes an original character into two or more different characters, e.g., "example" has been mis-recognized as "exannple."

Certain conventional approaches might include an auto-correct feature that suggests a correct spelling of a word but this feature may not be applicable under these circumstances since "GAMER" is a correct spelling. Another conventional approach to text editing may require the user to select the incorrect text (e.g., at least one user input such as a touch or swipe gesture), invoke or initiate a keyboard (e.g., at least one user input), delete the incorrect text (e.g., at least one user input), and re-type the correct text in its entirety, "G", "A", "R", "N", "E", and "R" (e.g., at least six user inputs for each key), and finally dismiss the keyboard (e.g., at least one user input)—resulting in ten user inputs just to replace one character with two characters. Yet another conventional approach to text editing on a computing device may allow the user to begin editing a word by positioning a cursor between "M" and "E" in "GAMER" (e.g., at least one user input), invoking a keyboard (e.g., at least one user input), delete the incorrect text (e.g., at least one user input), re-type correct text, "R" and "N", and finally dismiss the keyboard (e.g., at least one user input)—at least six user inputs. However, the number of user inputs and the time it takes to edit text is much more likely to be greater using this conventional approach. If the computing device does not include a touchscreen, the user may have to position the cursor using navigational keys or a pointing stick which require multiple user inputs and additional time. If the computing device includes a touchscreen, the user will have to magnify the touchscreen at the region of interest corresponding to the incorrect text in order to disambiguate touch selections.

Figure 1B:
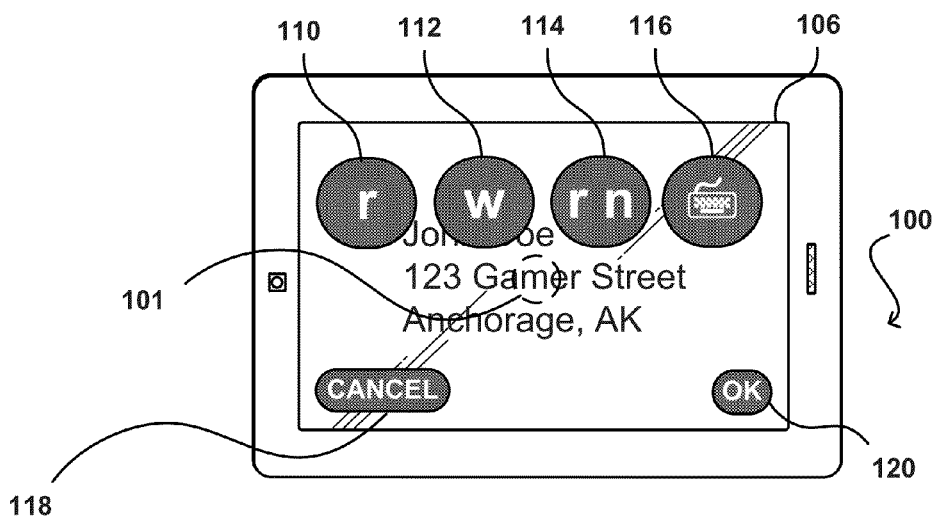

FIG. 1(b) illustrates an example of enabling quick character editing in accordance with an embodiment. The device 100 shown includes a touch display 106. The user has selected the character 101 recognized by the OCR process as "m" that she desires to correct by touching the "m" in "Gamer" (e.g., one user input). In other embodiments, the character 101 may not require selection by the user. Instead, the character 101 can be automatically determined to likely requiring edit, such as if the confidence score associated with an OCR process that recognized (or mis-recognized) the character 101 is below a threshold confidence score. After selection of the character 101, whether by a specific action by the user or automatically selected by the device 100, the user is then presented with user input options 110, 112, 114, 116, 118, and 120 overlaying the original set of characters derived from the OCR application. Each of these options can be selected by a single user input such as a touch. Options 110, 112, and 114 represent candidates for replacing the original character "m." Although FIG. 1(b) illustrates three replacement candidates numbering one to two characters each to replace one original character, it will be appreciated that any number of variations can be used in accordance with various embodiments. The number of replacement candidates can range between one and a number of candidates capable of fitting within the display 106. The number of characters in a replacement candidate and the number of characters to be replaced is also variable. For example, in a situation where the OCR process incorrectly determined the word "clearly" to be the word "dearly," i.e., a character decomposition error, the user may select the two characters "cl" to be replaced with the character "d."

In the example of FIG. 1(b) the user may edit the character by selecting the correct replacement candidate, e.g., option 114, with a touch and selecting the OK option 120 with a touch (e.g., two user inputs). Alternatively, the user can replace the original character by pressing and holding down the replacement candidate for a short period of time (e.g., one user input). The period of time may be specified by the user or may be determined by the computing device statically, or the period of time may be dynamically adjusted to tailor to the usage of the user. Using such approaches, the number of inputs required from the user may be significantly reduced. If the user has selected the wrong character or set of characters to replace, or changes her mind about replacing the original character, she can select the CANCEL option 118. When none of the replacement candidates are appropriate, the user may invoke or instantiate a keyboard by selecting keyboard option 116.

Figure 1C:
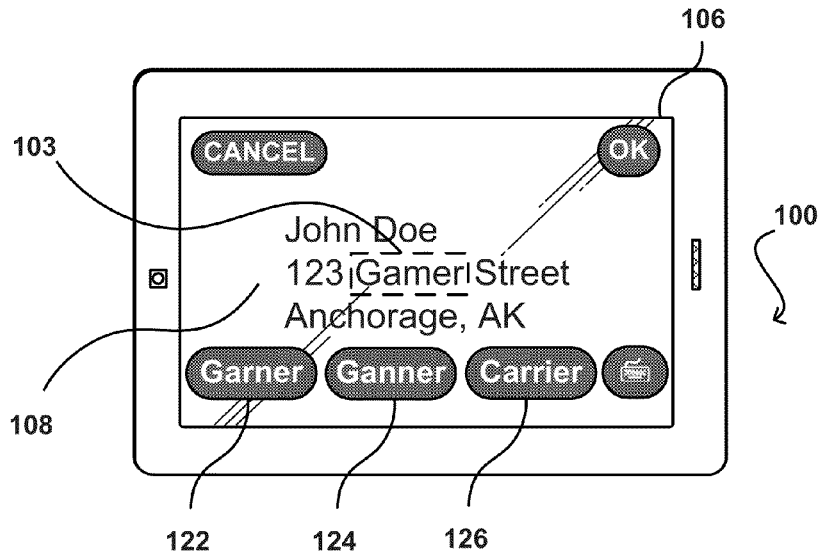

FIG. 1(c) depicts quick word editing in accordance with an embodiment. In this example, the user has selected word editing mode instead of the character editing mode shown in FIG. 1(b). In one embodiment, the user interface may include an element for toggling between character editing mode and word editing mode. In various embodiments where the computing device includes a multi-touch touchscreen, character editing mode and word editing mode can be differentiated by variations in touches. For example, a single finger touch or swipe may correspond to character editing mode and a two-finger touch or swipe may correspond to word editing mode. In still other embodiments, character editing mode and word editing mode can depend on the extent of the selection of the characters in a word. For instance, selecting only a subset of characters of a word will default to character editing mode and selection of the entire word will default to word editing mode.

In FIG. 1(c), the results 108 from an OCR process are displayed on a multi-touch display component 106 of computing device 100. The user has selected to edit the word 103 "Gamer" in word editing mode, or the device 100 has automatically determined that the word 103 is likely to be erroneous. Upon the selection of the word 103, the user is presented with several user input options, including user input options 122, 124, and 126. Each of options 122, 124, and 124 represent potential replacement words for "Gamer"—"Garner," "Ganner," and "Carrier," respectively. The replacement candidates can be derived from a combination of multiple sources, including standard dictionaries, user or crowd-sourced dictionaries, telephone and/or address directories, and other such references. In one embodiment, the references used for determining candidate replacement words depend on the context of the original word. For example, a regular expression or a template can be used to determine whether a set of characters likely comprises an address and a telephone/address directory can be used as the primary reference to derive replacement candidates. In FIG. 1(c), the OK, CANCEL, and keyboard options function similarly as described above in FIG. 1(b).

Figure 2A:
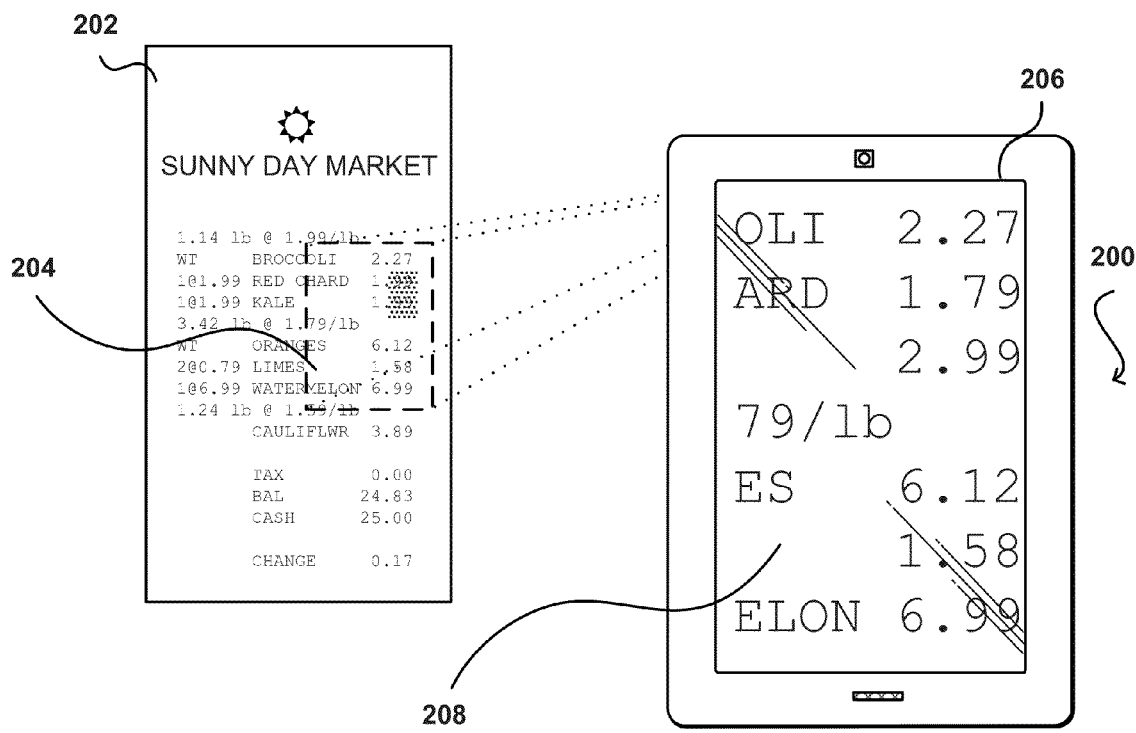
FIGS. 2(a), (b), and (c) illustrate an example of enabling quick text editing of an image featuring a receipt in accordance with an embodiment.

FIGS. 2(a), (b), and (c) illustrate an example of enabling quick character editing in accordance with an embodiment. The subject matter of a captured image shown in FIG. 2(a) is a grocery receipt 202. In this example, a user may want to track his personal expenses to provide as input into a personal finance application and/or for price comparison purposes to optimize a personal budget. Accordingly, an image capturing component of a device 200 is used to obtain an image of a segment 204 of the receipt 202 and a display component 206 of the computing device 200 is used to display the captured image. Subsequently, an OCR process is executed to convert the text at segment 204 into a machine-readable format. In the example of FIG. 2(a), a portion of segment 204 has been smudged such that the sub-total for "RED CHARD" is recognized as "1.79" instead of "1.99." Therefore, the user would like to edit the set of recognized characters 208 or the device 200 has determined that the characters 208 likely require editing. Some of the various conventional approaches discussed above with respect to FIG. 1(a), such as autocorrection suggestion, may not be applicable where, as here, numeric characters are concerned. Other conventional approaches may require the user to delete "1.79" and re-type "1", ".", "9", and "9" even though the OCR process has only committed one character interchange error.

Figure 2B:
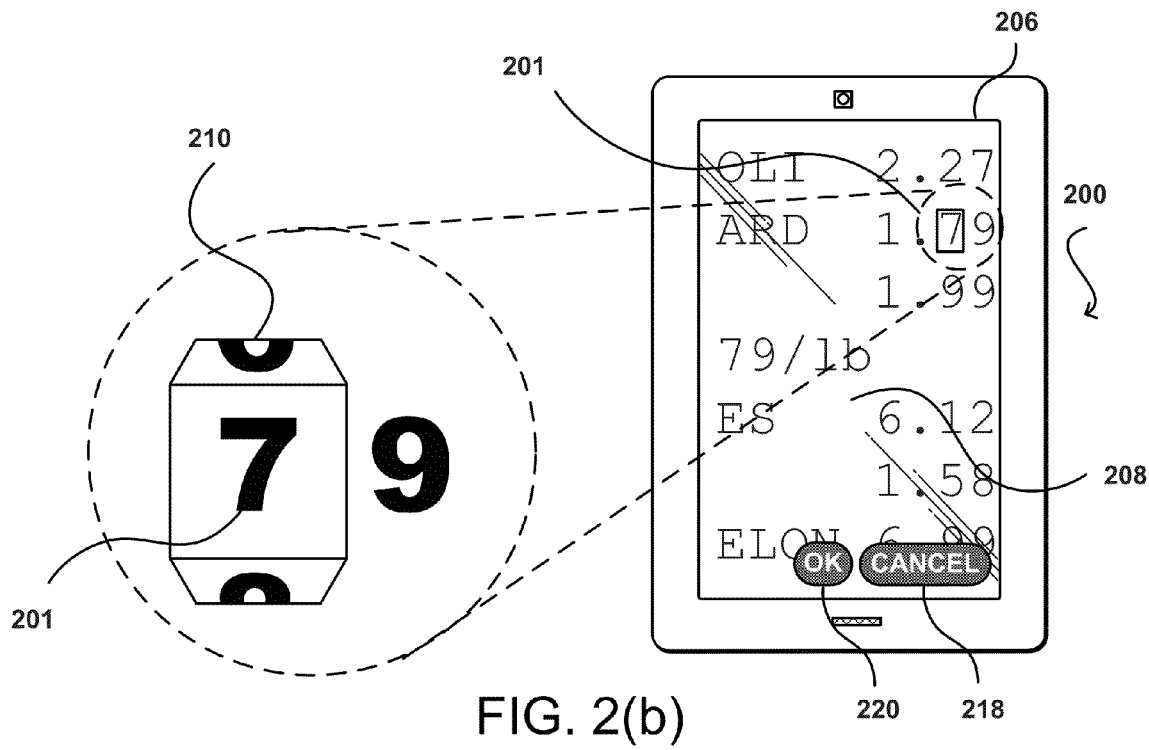

FIG. 2(b) illustrates an approach to enabling quick character editing according to an embodiment. The set of recognized characters 208 are presented on a display component 206 of computing device 200. The user or the device 200 has selected the mis-recognized character 201, i.e., the numeric character "7" in the sub-total for "RED CHARD," "1.79," for editing. Upon selection of the mis-recognized character 201, the display component 206 displays a user interface element 210 to enable the user to edit the mis-recognized character 201. In this example, user interface element 210 is a scrollable element implemented in software that operates similarly to a hardware combination lock. In this embodiment, the user interface element/scroll wheel 210 includes numeric characters from "0" through "9" on each face of the wheel and the user can select the correct numeric character by swiping up or down until the wheel 210 falls on the desired numeric character. The user can confirm his selection by touching the OK element 220, or the user can cancel editing the character 201 by touching the CANCEL element 218. It will be appreciated that the scroll wheel is not limited to numeric characters, and the scrollable element 210 can include alphabetic characters or other characters and symbols, such as "%" (percent sign) or "¶" (paragraph symbol). It will also be appreciated that the scrollable element 210 is not limited to one character on each face, or require ten faces. Any combination of characters, number of characters on each face, and number of faces can be used on a user interface element such as scroll wheel 210 in accordance with alternative embodiments.

Figure 2C:
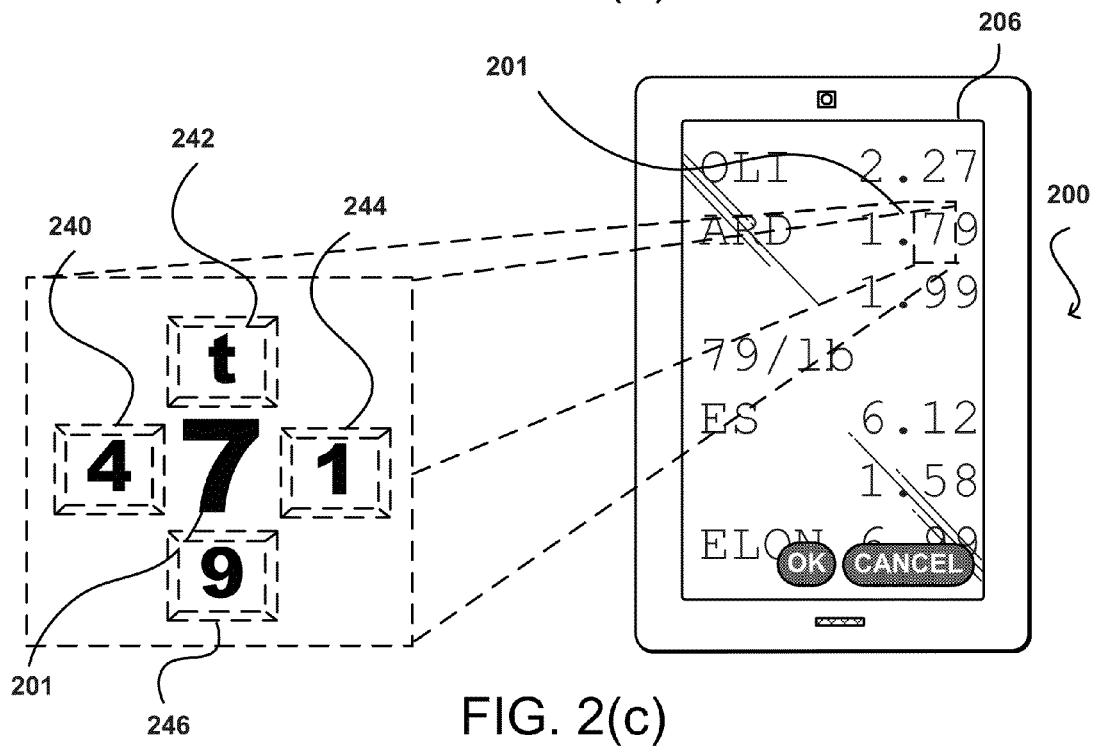

FIG. 2(c) illustrates another approach to enabling quick character editing in accordance with an embodiment. In this example, when the user or the device 200 selects the mis-recognized character 201 on the display component 206 of the computing device 200, a different user interface is displayed. Character replacement candidates 240, 242, 244, and 246 are presented to the user on display component 206 in accordance with the user or device 200 selection. Each of candidates 240, 242, 244, and 246 correspond respectively to the characters "4" (four), "t" (lowercase T), "1" (one), and "9" (nine). Replacement candidates 240, 242, 244, and 246 are also displayed on display component 206 in a semi-transparent manner to provide the user with as much of the previous context as possible when in character editing mode. Although replacement candidates 240, 242, 244, and 246 each comprise one character, it will be appreciated that replacement candidates may comprise multiple characters. In addition, other grid arrangements can be used, such as 2×3×2 or 3×3×3. Any number of characters and other grid arrangements, including a complete keyboard, can be used in alternative embodiments. In FIG. 2(c), the OK and CANCEL elements may operate similarly as described in FIG. 2(b).

Figure 3A:
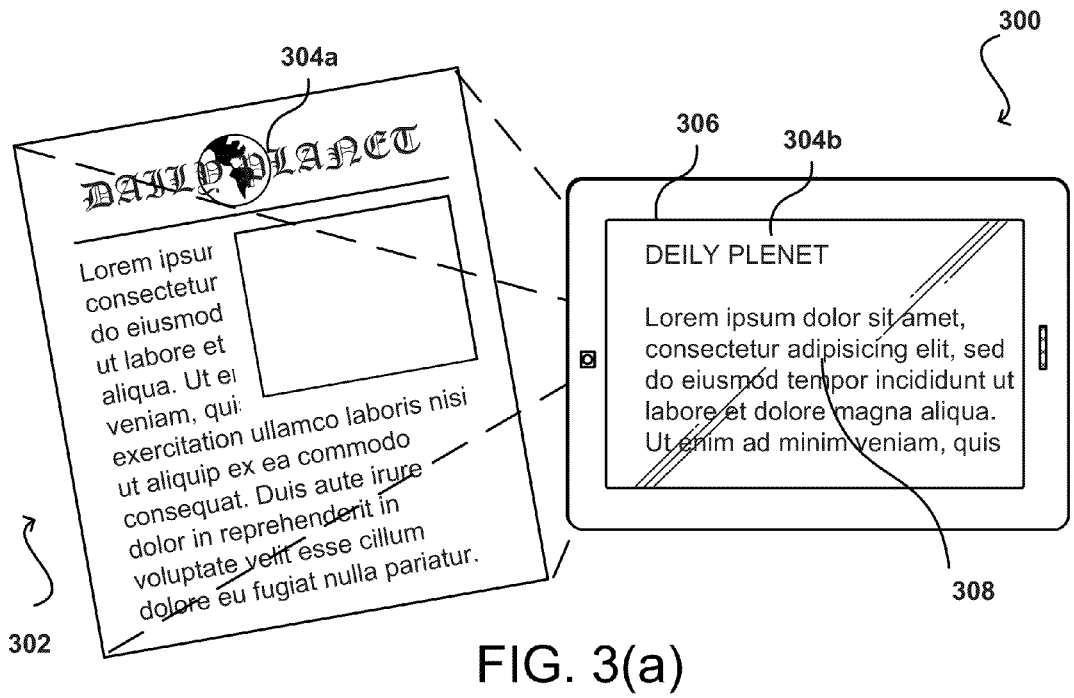
FIGS. 3(a), (b), and (c) illustrate an example of enabling quick text editing of a newspaper in accordance with an embodiment.
Figure 3B:
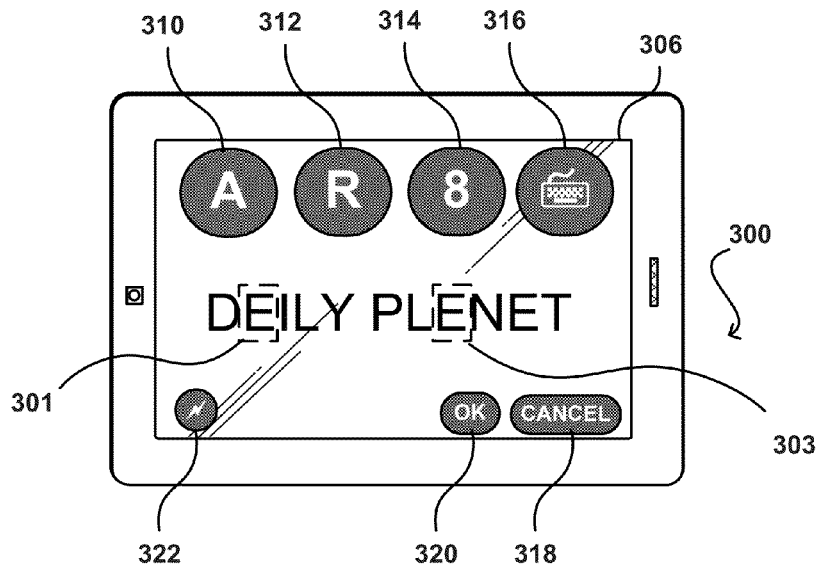

FIGS. 3(a), (b), and (c) illustrate an example of enabling quick text editing in accordance with an embodiment. In this example, the subject matter of the acquired image is a newspaper 302 as depicted in FIG. 3(a). The user may wish to capture an image of the newspaper as the newspaper may contain content that the user may wish to follow up at a later time. The acquired image is obtained using an image capturing component (not shown) of computing device 300 and a set of characters 308 is extracted from the image using an OCR process and displayed on display component 306 of the device 300. The actual masthead 304a for the newspaper 302 is "DAILY PLANET" but the recognized masthead 304b is determined to be "DAILY PLENET" by the OCR process. Thus, the user would like to correct the mis-recognized characters or the device 300 automatically determines that certain characters are likely to have been mis-recognized by the OCR process. In FIG. 3(b), an example of character editing mode, the user or device 300 selects the first mis-recognized character 301, "E," displayed on display component 306 of device 300. Upon selection of mis-recognized character 301, user interface elements 310, 312, 314, 316, 318, 320, and 322 are displayed on display component 306. User interface elements 310, 312, and 314 each represent a replacement candidate for the mis-recognized character 301, "A", "R", and "8," respectively. In this example, each instance of the character "A" in the masthead 304a from FIG. 3(a) has been mis-recognized as the character "E." It may be advantageous to enable the user to select every instance of the mis-recognized character and edit each instance with a minimal number of user inputs. Accordingly, user interface element 322 is provided to allow a user to select all characters or words that are similar to a particular mis-recognized character or word. In the example of FIG. 3(b), a second mis-recognized character 305 is highlighted when the user touches or swipes user interface element 322. It will be appreciated that any number of ways to indicate simultaneous editing of multiple sets of characters, including underlining, circling or boxing, glowing effects, rendering in different colors, etc. The user can then replace each of the mis-recognized characters 301 and 303 with the correct character by selecting user interface element 310 and the OK element 320, or by holding down user interface element 310 for a specified amount of time. In situations where the user interface element 322 incorrectly selects other mis-recognized characters or words, the user can de-select these other instances using appropriate commands or gestures, such as by touching or swiping those instances. De-selection of such an instance will remove highlighting, underlining, circling or boxing, glowing effects, etc. for the instance, and the instance will not be edited when the user selects an appropriate replacement candidate. In FIG. 3(b), the KEYBOARD option 316 and the CANCEL option 318 may perform similar functions as those elements are described in FIG. 1(b).

Figure 3C:
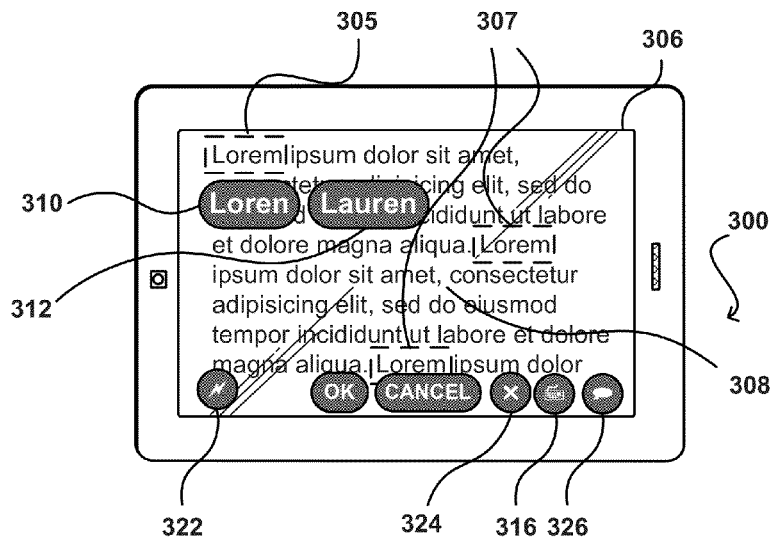

FIG. 3(c) illustrates an example of enabling quick word editing according to an embodiment. In this example, the user or device 300 selects a word editing mode with respect to one of the stories of newspaper 302 (of FIG. 3(a)). The user or device 300 selects the word 305, "Lorem," for editing. Upon selection of word 305, user interface elements 310, 312, 316, 322, 324, and 326 are presented on display component 306. Options 310 and 312 represent candidate words for replacing word 305. The user or device 300 may determine that the OCR process has incorrectly recognized each instance of "Lorem" in the body of text 308, and the user touches or swipes user interface element 322 or the device automatically selects the other instances 307 of "Lorem." The user can then change each of words 305 and 307 by selecting one of the replacement candidates 310 or 312, or by selecting the KEYBOARD element 316 if none of the replacement candidates are desired by the user.

FIG. 3(c) also includes additional user interface elements, DELETE option 324 and VOICE option 326, in accordance with certain embodiments. DELETE element 324 allows a user to remove a particular word upon selection of that word (or multiple similar instances of that word) while in editing mode. In other embodiments, deletion of a particular word can be enabled according to a specific user command or gesture, such as an up-down swipe or "pinching" the word. These different approaches can be alternatively implemented or combined in various embodiments. In addition, it will be appreciated that these approaches can also be used in character editing mode to delete a character or a set of characters. The VOICE element 326 can be utilized to enable/disable user voice commands to be combined with other user commands or gestures in accordance with certain embodiments. For example, the user can select a mis-recognized character or word using a touch gesture and, if the VOICE element 326 is enabled, an audio element of device 300 can be activated to receive a character or word replacement expressed vocally instead of as a touch selection.

Figure 4A:
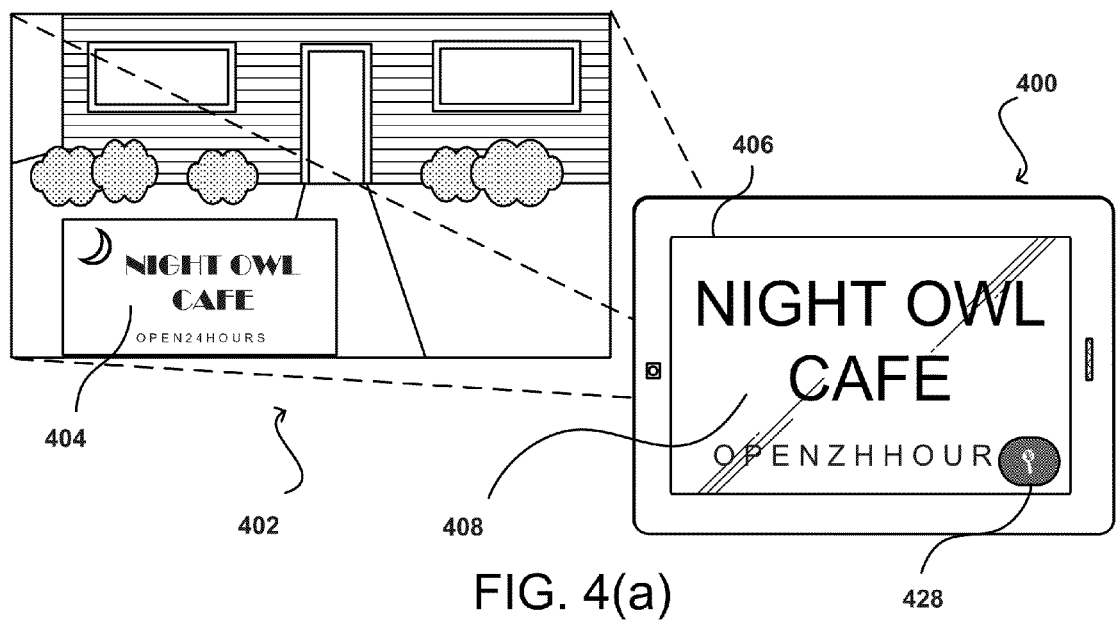
FIGS. 4(a), (b), and (c) illustrate an example of enabling quick text editing of an image in accordance with an embodiment.

FIGS. 4(a), (b), and (c) illustrate an example of enabling quick text editing in accordance with an embodiment. In this example, the subject matter of a captured image is an image 402 of a business location called the "Night Owl Cafe," including a placard comprising text 404 for the business as depicted in FIG. 4(a). The image 402 could be a live camera view of computing device 400 or an image stored on device 400. As discussed above, the image 402 can be acquired using an image capturing component of device 400 or from some other file or data streaming method supported by device 400. The image 402 may be displayed on a display component 406 of device 400, and an OCR process can be performed on the image 402 to acquire recognized text 408. Editing mode is subsequently initiated. Various approaches to enabling edit mode will be discussed in detail below. In the example of FIG. 4(a), upon entering edit mode, the display component 400 is configured to automatically magnify and center on recognized text 408. User interface element 428 enables the user to zoom in and out of the image according to a single-finger touch (e.g., zoom in) or a double-finger touch (e.g., zoom out). In other embodiments, two separate user interface elements may be provided to enable zoom in and out, respectively. In still other embodiments, no additional user interface element is displayed but the user can "pinch" the touch display interface 406 to zoom out and "un-pinch" display component 406 at a region of interest to zoom in to that region.

Figure 4B:
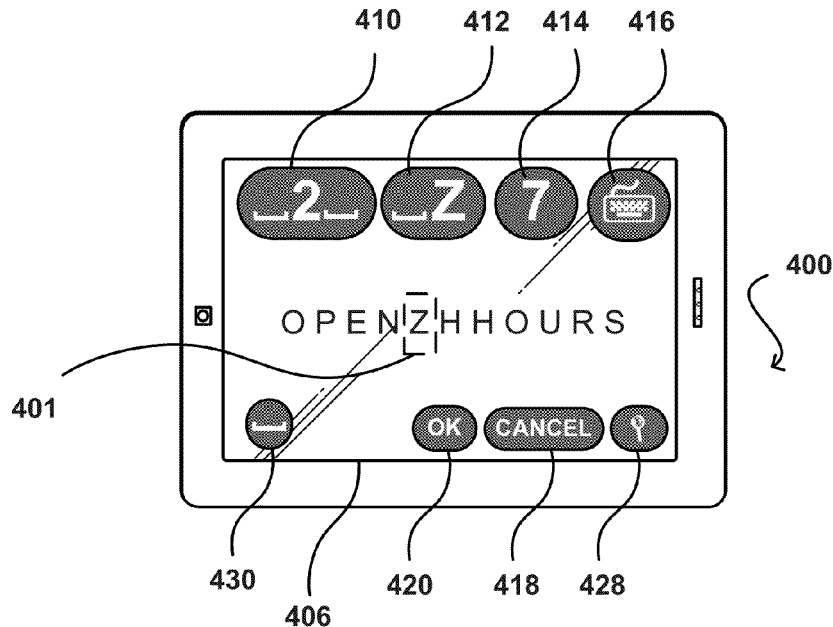

In FIG. 4(b), the user or the device 400 has selected to edit character 401 in character editing mode, whereupon user interface options 410, 412, 414, 416, 418, 420, 428, and 430 are presented on display component 406 of computing device 400. Options 410, 412, and 414 may each represent replacement candidates for character 401. In various embodiments, the replacement candidate selection algorithm may be sufficiently intelligent to provide replacement character sets including white space, such as one or more spaces, a tab, a carriage return, etc. For example, option 410 can represent a character set comprising a space, the numeric character "2," and another space, and option 412 can represent a character set comprising a space and the character "Z." Option 414 may simply correspond to the numeric character "7." In another embodiment, the user can select a location between two characters, such as in between the characters "N" and "Z" and insert a space utilizing a user interface element such as element 430. In yet another embodiment, the user can select the location between two characters and use a specific gesture such as an "un-pinching" touch gesture to insert a space. The user can select the desired replacement candidate by selecting one of options 410, 412, or 414, or can select to trigger a keyboard by selecting KEYBOARD option 416 if none of the options are correct replacement candidates. The user can confirm the edit by selecting the OK option 420 or cancel the edit by selecting the CANCEL option 418.

Figure 4C:
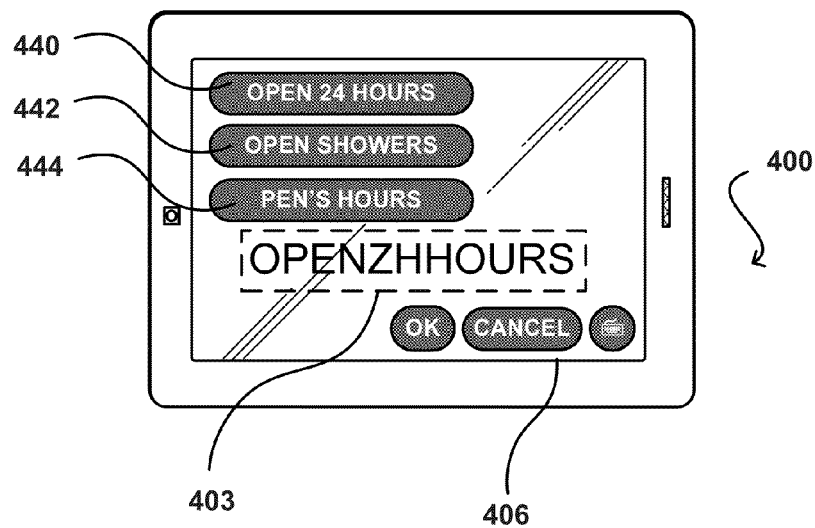

In FIG. 4(c), the user or the device 400 has selected to edit the mis-recognized word 403 in word editing mode. Upon selection of the word 403, user interface elements 440, 442, and 444 are displayed on display component 406. In this example, the replacement candidate selection algorithm may be sufficiently intelligent to determine replacement candidate sets that will decompose (or compose) words by automatically inserting (or deleting) appropriate spaces between words. The KEYBOARD option 416, CANCEL option 418, OK option 420, and MAGNIFY option 428 may operate similarly as discussed above in FIGS. 1(b) and 4(a).

Figure 5:
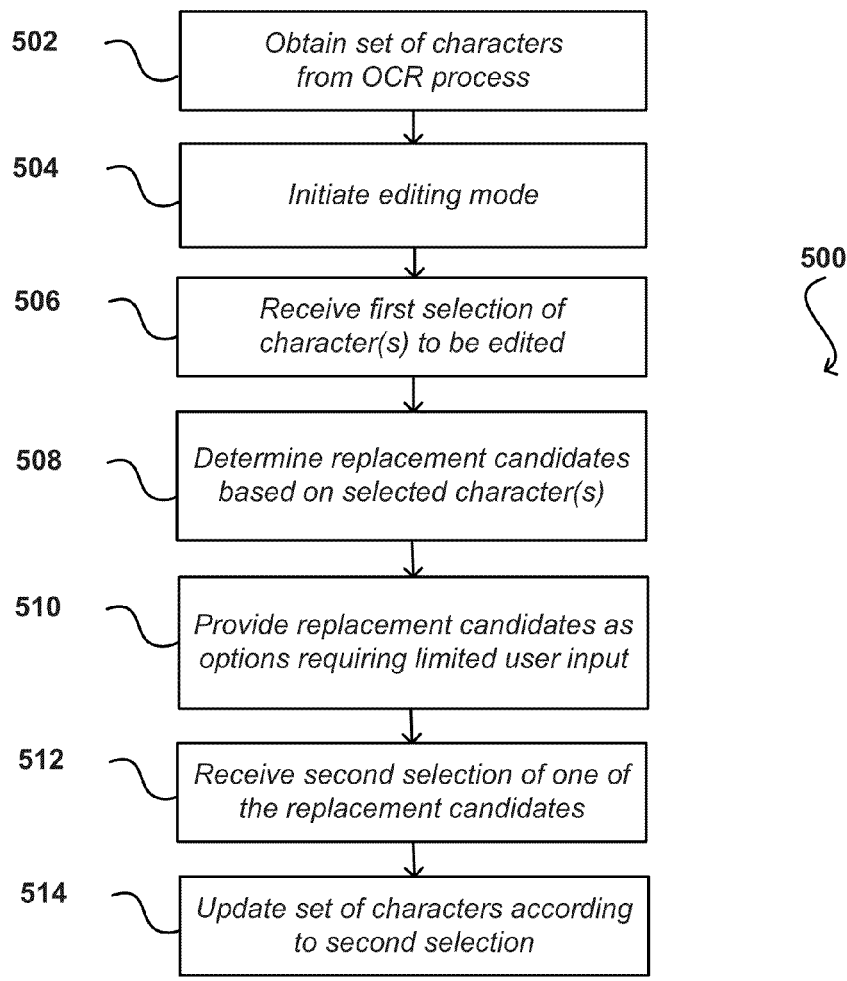
FIG. 5 illustrates an example process to enable quick text editing in accordance with various embodiments

FIG. 5 illustrates an example process 500 for enabling quick text editing that can be used in accordance with various embodiments. It should be understood that, for any process discussed herein, there can be additional, fewer, or alternative steps performed in similar or alternative orders, or in parallel, within the scope of the various embodiments unless otherwise stated. In this example, the process is initiated by a computing device first obtaining a set of characters 502, such as from an OCR process executed on an image containing data representing text. As discussed above, OCR is known in the art and a number of commercial and open source OCR libraries are available to provide this functionality and will not be discussed herein in detail.

After a set of characters has been obtained by the computing device, such as by the aforementioned OCR process, the computing device may initiate editing mode 504 to enable the user to edit the set of characters to the extent the OCR process has mis-recognized any characters or words. In another embodiment, the computing device automatically determines characters (or words) likely to require editing and selects the characters (or words) likely to be erroneous for the user. The edit mode can be activated in response to any appropriate action, such as a user opening an application or selecting an option, a user depressing a button on the computing device designated for edit mode, performing a gesture or providing other such input, and the like. In other embodiments, the edit mode might be activated by voice command. Upon initiation of editing mode, the user or the computing device may select a few characters or words believed to require editing. As discussed above, the character or word selection can be achieved by a minimal number of user commands or gestures, such as one to a few touches or one to a few swipes of a touch interface component of the computing device, or zero user commands or gestures (in the embodiments where the computing device determines the characters or words likely to require editing). In addition, voice commands may be another way for the user to select a few characters or words for quick text editing. Upon the selection of the characters or words requiring editing, the computing device receives the selection 506.

When the computing device receives the selection of the characters or words 508 to be edited, a determination is made for replacement candidates corresponding to the selected characters or words. In one embodiment, the candidate replacement selection is performed by the computing device. In other embodiments, the candidate replacement selection system operates within a client-server model. The computing device acts as a client that makes a request to an application server and/or web server for replacement candidates based on the selection of the character or word. The application server/web server responds by providing to the computing device the replacement candidates.

In one embodiment, common OCR errors for a particular character or word can be determined from analyzing a corpus of documents using one or more OCR engines. The data from this analysis can be organized according to a confusion matrix. A confusion matrix can refer to a table layout that provides for visualization of the performance of an artificially intelligent system such as an OCR application. Each column of the table may represent the OCR process's "best guess" of a particular character, and each row of the table may represent the actual character. An example of a confusion matrix is set forth in Table 1.

TABLE 1

|  | Recognized Values | | | | |
|---|---|---|---|---|---|
| True Values | l | I | i | 1 | ! |
| l | 5 | 3 | 1 | 1 |  |
| I | 2 | 3 | 2 | 2 | 1 |
| i | 1 | 1 | 7 |  | 1 |
| 1 | 1 | 1 | 1 | 7 |  |
| ! |  |  |  | 1 | 9 |

In the confusion matrix above, characters "l" (lowercase L), "I" (uppercase I), "i" (lowercase I), "1" (one), and "!" (exclamation point) are each provided as input to a particular OCR process ten times and the output of that process is provided in the confusion matrix. In this example, when the character "l" (lowercase L) was provided as input, the OCR process correctly recognized the input character was an "l" (lowercase L) five times and incorrectly recognized the "l" (lowercase L") as the character "I" (uppercase I) three times, the character "i" (lowercase I) once, and the character/digit "1" (one) once. The number of times this particular OCR process correctly recognized each character is located at the diagonal (top left to bottom right) of the confusion matrix. One approach to determining replacement candidates in accordance with certain embodiments is to leverage such data to generate a lookup table, hash map, or other associative data structure. Replacement candidates can be selected according to the likelihood a selected character will be recognized as a different character. For example, when the user selects to edit a character which has been recognized as an "l" (lowercase L), the selected character "l" may be input into a lookup table or hash map to locate corresponding replacement candidates, such as the character "I" (uppercase I), e.g., which has been recognized as the character "l" (lowercase L) 30% of the time according to the example confusion matrix above; the character "i" (lowercase I), e.g., incorrectly recognized 10% of the time; and/or the character/digit "1" (one), e.g., mis-recognized for the character "l" (lowercase L) 10% of the time. As discussed above, the data used to populate a confusion matrix such as the example above can be obtained by a comparison of a baseline set of documents in machine-readable format that can be imaged and processed using one or more OCR search engines to determine the probabilities of OCR errors for characters or words. User data can also be used to populate a confusion matrix. For example, it may be advantageous to utilize user data if the user is associated with certain handwriting that is particularly distinct or the user consistently makes the same word processing errors. The OCR process and/or replacement candidate selection algorithm may become more accurate over time as it learns from the behavior of the user. In some embodiments, the aggregated data of a collection of users can be also used to populate a confusion matrix which can make the replacement candidate selection system more robust and dynamic.

In another embodiment, image processing techniques can be used to determine candidate replacements for selected characters or words. Features of the images for the selected characters or words can be extracted and compared against an image library, and the best matches can be selected as replacement candidates. The image library may include image data generated by a user or a collection of users to enhance the accuracy of the results of the candidate selection system. In yet another embodiment, the one or more OCR engines from step 502 can be configured to return an array of replacement candidates for each character or word below a threshold confidence score, and the array may comprise one or more results of each of the OCR engines for the selected character or word. In various embodiments, one or more of these approaches can be combined to generate replacement candidates.

After replacement candidates for selected characters or words are determined, the computing device may display the replacement candidates on a display component of the device or otherwise provide the replacement candidates 510 as options to the user. Preferably, the options are presented to the user in a manner that limits the number of user inputs required to activate each option. The user selects one of the options which is received to the computing device 512, and the computing device updates the original set of characters according to the user selection 514.

Figure 6:
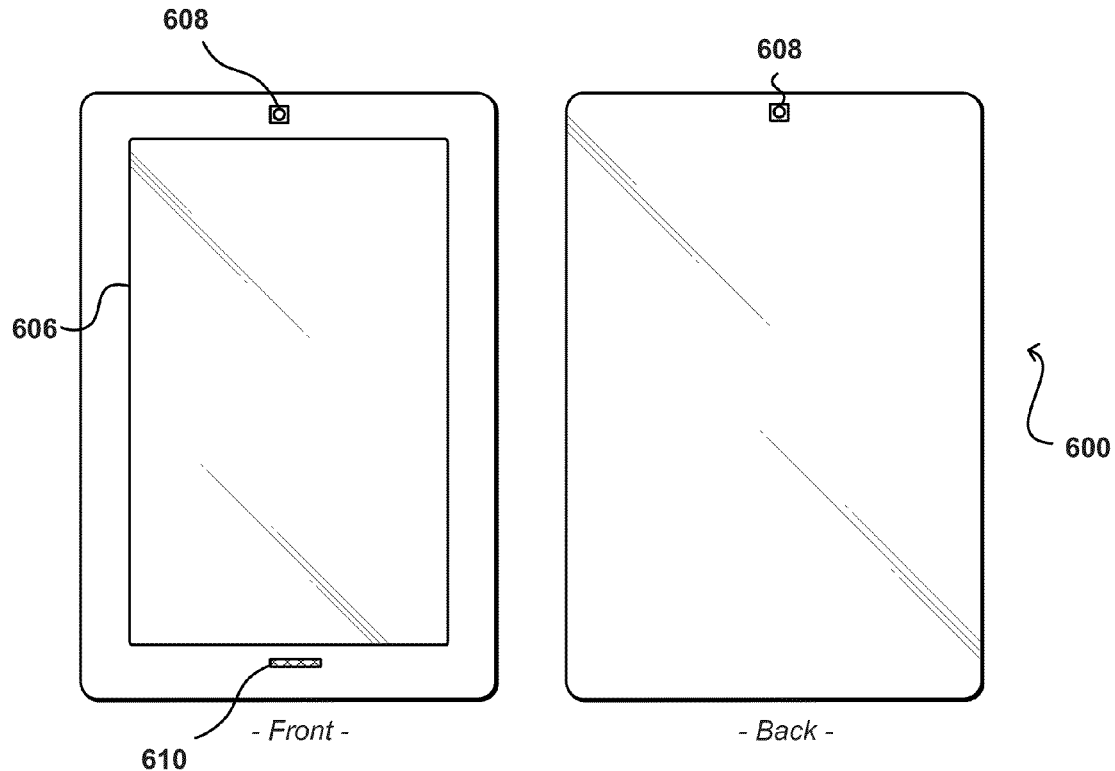
FIG. 6 illustrates an example of a computing device that can be used in accordance with various embodiments.
Figure 7:
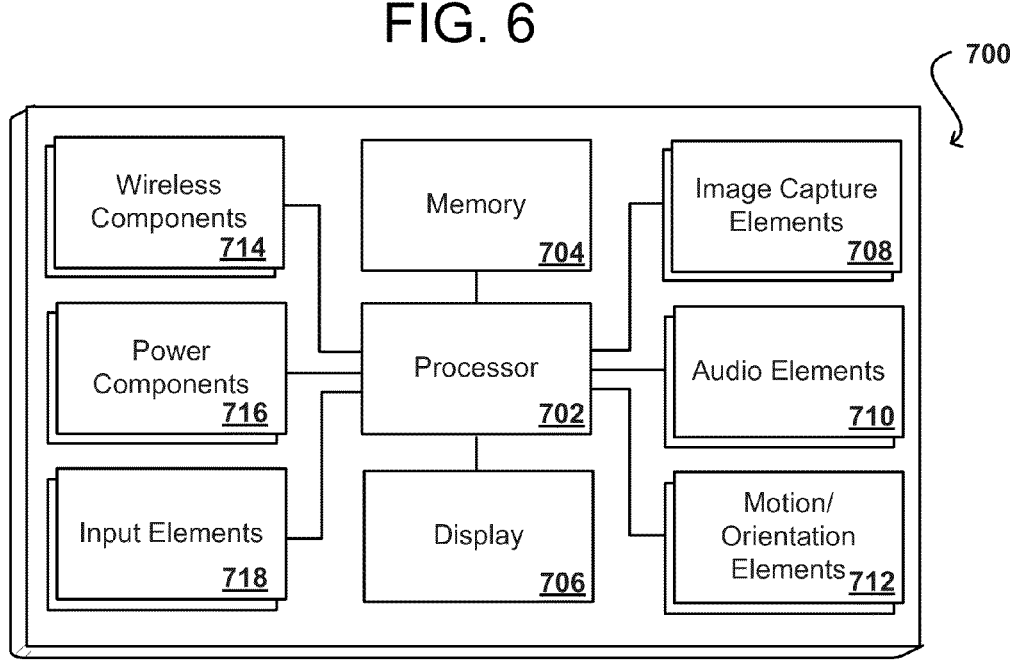
FIG. 7 illustrates an example configuration of components of a computing device such as that illustrated in FIG. 6.

FIG. 6 illustrates an example computing device 600 that can be used to perform approaches described in accordance with various embodiments. In this example, the device has an image capturing component 608 on each of a same and opposite side of the device as a touch display element 606, and enabling the device to capture images in accordance with various embodiments. The device 600 also includes a microphone 610 for receiving voice commands in accordance with certain embodiments. In order to provide various functionality described herein, FIG. 7 illustrates an example set of basic components of a computing device 700, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. As discussed above, the device in many embodiments will include one or more image capture elements 708, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element can include, or be based at least in part upon any appropriate technology, such as a CCD or CMOS image capture element having a sufficient resolution, focal range, viewable area, to capture an image.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one or more motion and/or orientation elements 712 that provide information such as a position, direction, motion, or orientation of the device. These one or more motion and/or orientation determining elements 712 can include, for example, accelerometers, inertial sensors, electronic gyroscopes, electronic compasses, and GPS elements.

The example device can also include one or more additional input devices 718 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
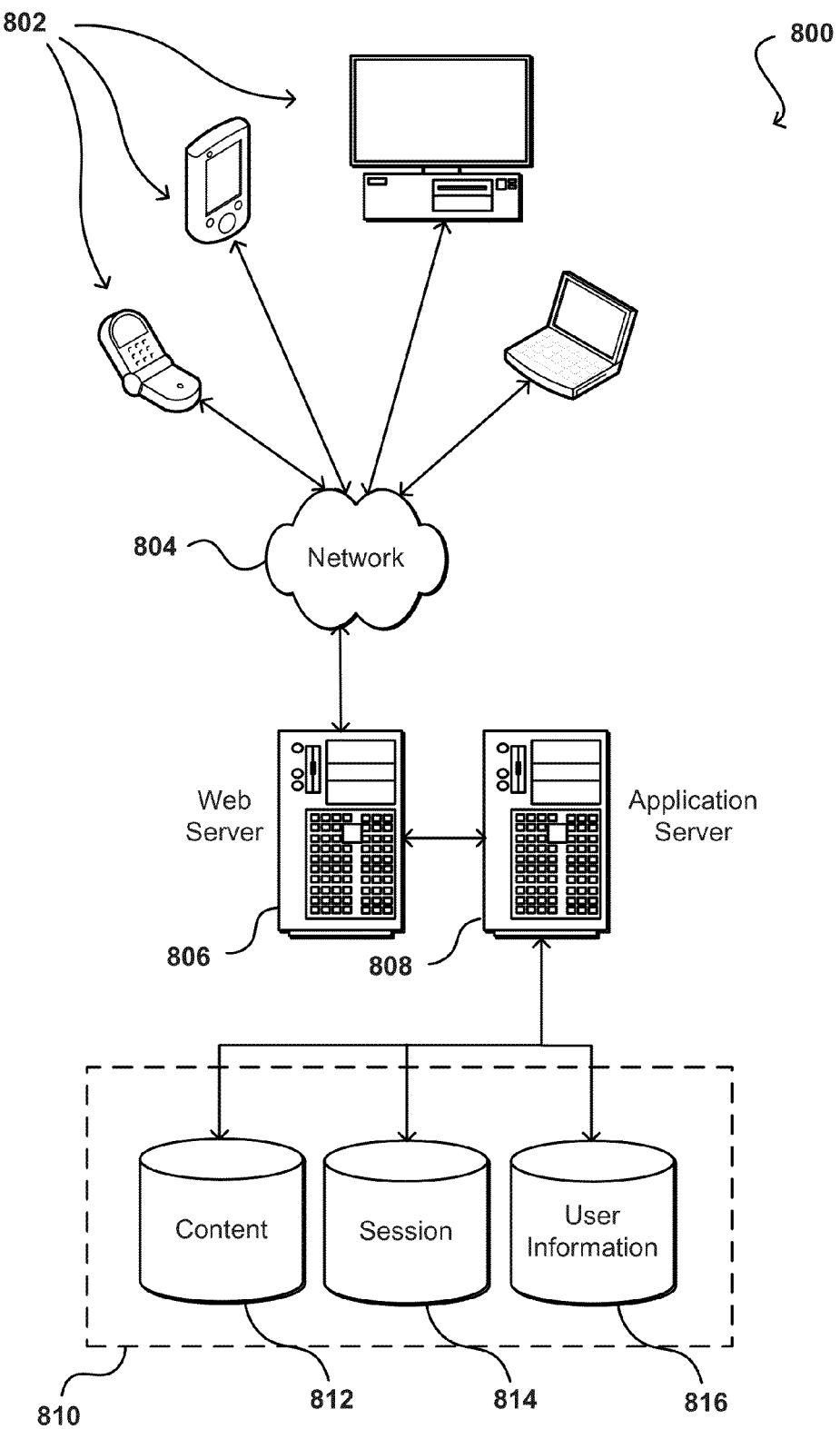
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for text editing on a computing device, comprising:
under control of one or more computer systems configured with executable instructions,
capturing, using a camera of a computing device, a live view of an object including text;
determining a set of characters corresponding to the text using an optical character recognition (OCR) process performed on image data corresponding to the live view of the object;
displaying on a display component of the computing device, over the live view of the object, the set of characters as one or more first user-selectable elements;
receiving a first request to replace at least one character of the set of characters according to a first selection of the one or more first user-selectable elements;
determining a plurality of sets of one or more alternative characters with which to replace the at least one character;
displaying on the display component one or more second user-selectable elements each corresponding respectively to one of at least a subset of the plurality of sets of one or more alternative characters;

receiving a second request to replace the at least one character according to a second selection of one of the one or more second user-selectable elements; and replacing the at least one character in the set of characters with the one of at least a subset of the plurality of sets of one or more alternative characters corresponding to the second request.

2. The computer-implemented method of claim 1, wherein the at least one character comprises a first word and each of the plurality of sets of one or more alternative characters comprises a second word.

3. The computer-implemented method of claim 1, wherein:

the one or more second user-selectable elements further comprise a user-selectable element corresponding to an instantiation of a keyboard; and the one of at least a subset of the plurality of sets of one or more alternative characters corresponding to the second request to replace the at least one character comprises a manual entry of the one or more alternative characters on the keyboard.

4. A computer-implemented method for text editing, comprising:

under control of one or more computer systems configured with executable instructions, capturing, using a camera of a computing device, a live view of an object including text;

obtaining a set of characters corresponding to the text from image data corresponding to the live view of the object;

displaying on a display component of the computing device, over the live view of the object, the set of characters;

determining at least one set of one or more alternative characters with which to replace at least one character of the set of characters; and displaying on the display component one or more user-selectable elements each corresponding respectively to one of the at least one set of one or more alternative characters.

5. The computer-implemented method of claim 4, further comprising:

receiving a request to replace at least one character of the set of characters according to a selection of one of the one or more user-selectable elements; and replacing the at least one character in the set of characters with the one or more alternative characters corresponding to the selection.

6. The computer-implemented method of claim 5, wherein the request to replace at least one character corresponds to a single user input.

7. The computer-implemented method of claim 5, further comprising:

receiving a second request to locate each instance in the set of characters similar to the at least one character; and replacing each instance in the set of characters similar to the at least one character with the one or more alternative characters corresponding to the selection.

8. The computer-implemented method of claim 5, wherein the request to replace the at least one character comprises deleting the at least one character.

9. The computer-implemented method of claim 5, wherein the request to replace the at least one character comprises a vocal expression.

10. The computer-implemented method of claim 4, wherein the set of characters are obtained from an OCR process performed on the image data.

11. The computer-implemented method of claim 4, wherein at least one of the one or more user-selectable elements are displayed semi-transparently.

12. The computer-implemented method of claim 4, wherein at least one of the one or more user-selectable elements includes a scrollable element having a plurality of second user-selectable elements each comprising one of the set of one or more alternative characters.

13. The computer-implemented method of claim 4, wherein at least some of the one or more user-selectable elements are arranged in a multi-row grid.

14. The computer-implemented method of claim 4, wherein determining the at least one set of one or more alternative characters is based at least in part upon historical text editing data of at least one user.

15. The computer-implemented method of claim 4, wherein the at least one character comprises a first word and at least one of the one or more user-selectable elements corresponds to a second word.

16. A computing device for text editing, comprising:

at least one processor;

a touch display component;

an image capturing component;

a memory device including instructions that, when executed by the at least one processor, cause the computing device to:

capture, using the image capturing component, a live view of an object including text;

obtain a set of characters corresponding to the text from an OCR process performed on image data corresponding to the live view of the object;

display on the touch display component, over the live view of the object, the set of characters;

determine at least one set of one or more alternative characters with which to replace at least one character of the set of characters; and display on the touch display component one or more user-selectable elements each corresponding respectively to at least a portion of one of the at least one set of one or more alternative characters.

17. The computing device of claim 16, wherein the instructions when executed further cause the computing device to:

receive a request to replace at least one character of the set of characters according to a selection of one of the one or more user-selectable elements; and replace the at least one character in the set of characters with the one or more alternative characters corresponding to the selection.

18. The computing device of claim 17, wherein the instructions when executed further cause the computing device to:

receive a second request to locate each instance in the set of characters similar to the at least one character; and replace each instance in the set of characters similar to the at least one character with the one or more alternative characters corresponding to the selection.

19. The computing device of claim 16, wherein the at least one character comprises a first word and at least one of the one or more user-selectable elements corresponds to a second word.

20. The computing device of claim 16, wherein the instructions to cause the computing device to determine the at least one set of the one or more alternative characters is based at least in part upon historical text editing data of at least one user.

21. A non-transitory computer-readable storage medium storing instructions for editing text, the instructions when executed by a processor causing the processor to:

capture, using a camera of a computing device, a live view of an object including text;

obtain a set of characters corresponding to the text from image data corresponding to the live view of the object;

display on a display component of the computing device, over the live view of the object, the set of characters;

determine at least one set of one or more alternative characters with which to replace at least one character of the set of characters;

display on the display component one or more user-selectable elements each corresponding respectively to one of the at least one set of one or more alternative characters;

receive a request to replace the at least one character in the set of characters according to a selection of one of the one or more user-selectable elements; and replace the at least one character in the set of characters with the one or more alternative characters corresponding to the selection.

22. The non-transitory computer-readable storage medium of claim 21, wherein the at least one character comprises a first word and at least one of the one or more user-selectable elements corresponds to a second word.

23. The non-transitory computer-readable storage medium of claim 21, wherein the set of characters are obtained from an OCR process performed on the image data.

* * * * *